Dec. 3, 1968   D. N. W. BADCOCK   3,414,747
ELECTRIC MOTORS

Original Filed April 17, 1964   6 Sheets-Sheet 1

INVENTOR
D. N. W. Badcock
BY Wenderoth, Lind
and Ponack
ATTORNEYS

Dec. 3, 1968     D. N. W. BADCOCK     3,414,747
ELECTRIC MOTORS

Original Filed April 17, 1964     6 Sheets-Sheet 2

INVENTOR
D. N. W. Badcock
BY Wenderoth,
Lind and Ponack
ATTORNEYS

Dec. 3, 1968   D. N. W. BADCOCK   3,414,747
ELECTRIC MOTORS
Original Filed April 17, 1964   6 Sheets-Sheet 4

INVENTOR
D. N. W. Badcock
BY Wenderoth,
Lind and
Ponack
ATTORNEYS

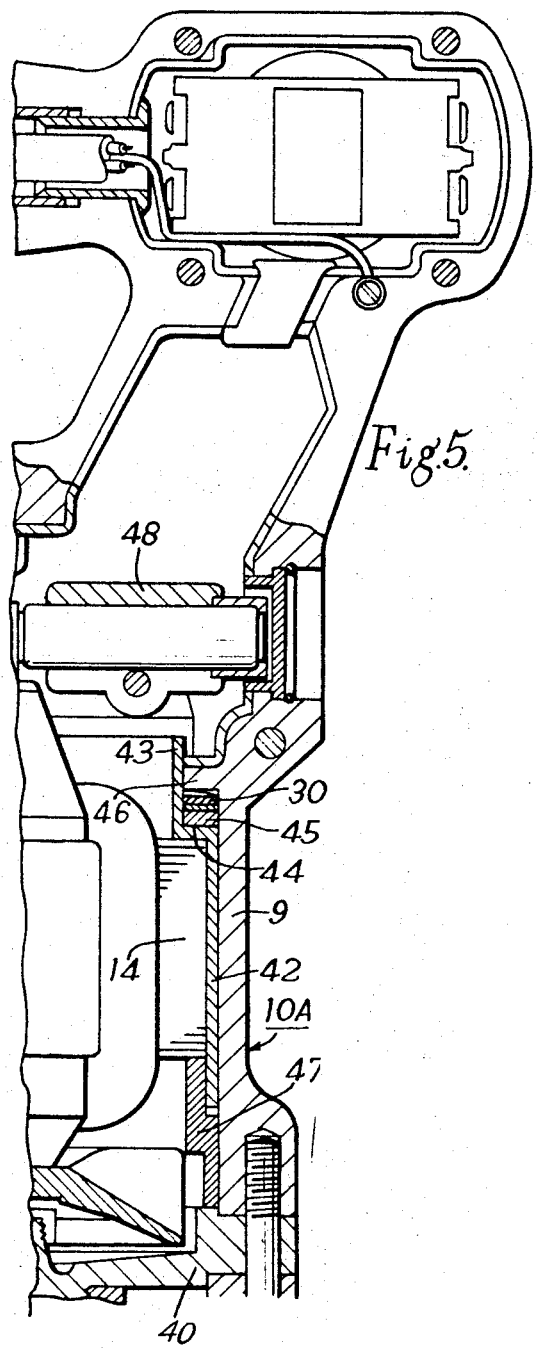

Dec. 3, 1968  D. N. W. BADCOCK  3,414,747
ELECTRIC MOTORS
Original Filed April 17, 1964  6 Sheets-Sheet 6
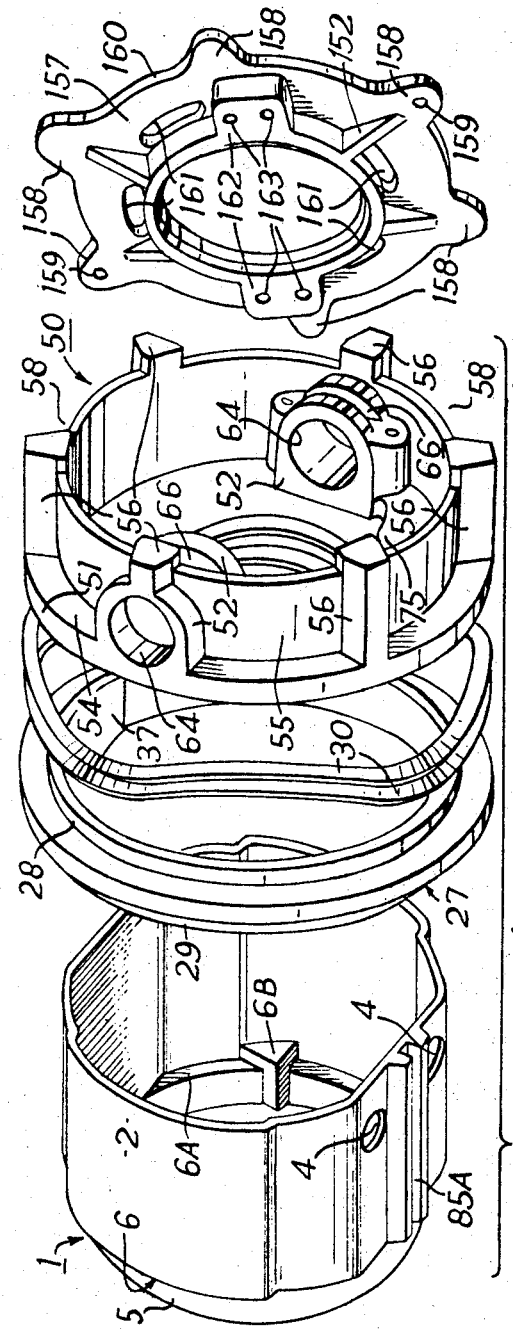
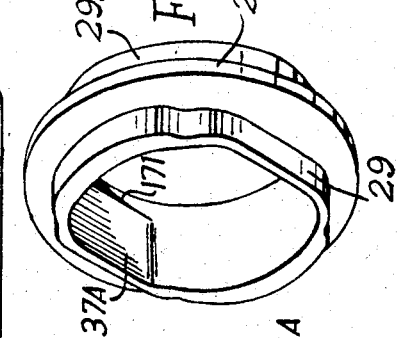
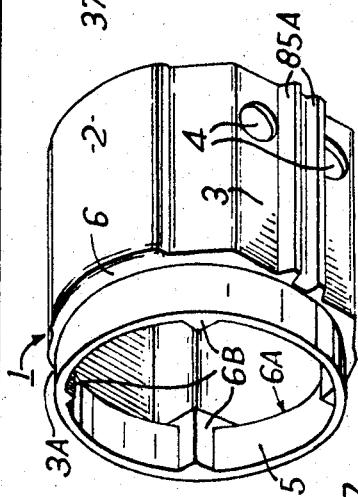
INVENTOR
D. N. W. Badcock
BY Wenderoth,
Lind and Ponack
ATTORNEYS

United States Patent Office 3,414,747
Patented Dec. 3, 1968

1

3,414,747
ELECTRIC MOTORS
David Norman William Badcock, London, England, assignor to Kango Electric Hammers Limited, London, England, a British company
Continuation of application Ser. No. 360,630, Apr. 17, 1964. This application Aug. 9, 1967, Ser. No. 659,534
Claims priority, application Great Britain, Apr. 22, 1963, 15,820/63
9 Claims. (Cl. 310—50)

ABSTRACT OF THE DISCLOSURE

An electric motor for driving a portable power tool. The motor has casing end members which are rigidly but detachably secured relative to each other and which have bearings to receive the armature of the motor. A sleeve is disposed axially against one end member and extends toward the other end member. It is of electrically insulating material, and is open at the end nearer the other end member. The sleeve has an internal abutment surface disposed adjacent and facing axially away from the one end member. A stator assembly is wholly accommodated within the length of the sleeve and is in axial abutment with the internal abutment surface. Spring means is provided between the other end member and the stator assembly to press the assembly against the abutment surface within the sleeve and to press the sleeve against the abutment surface within the main housing. The arrangement is such that the various elements are held in place by a single resilient means and the construction can be dismantled and assembled easily.

---

This is a continuation of application Serial No. 360,630, filed Apr. 17, 1964, now abandoned.

This invention relates to electric motors and has particular though not exclusive reference to motors for use on portable hammers and like motorised tools. The main object of the present invention is to provide for simpler and more economical construction and assembly of an electric motor.

According to this invention, there is provided an insulated electric motor comprising a motor housing including a main housing part having an opening at one end and having adjacent the other end thereof an internal abutment surface facing towards one end, and a cover detachably secured to the main housing part at said one end for closing said opening, and a plurality of coaxially arranged parts disposed within the housing between said internal abutment on the cover, which parts comprise a locating sleeve made from electrically insulating material and capable of insertion in the main housing part through said opening, which sleeve has an abutment surface facing said internal abutment surface of the main housing part and has an internal shoulder facing towards the cover, a stator assembly one end of which is disposed opposite said internal shoulder and the full length of which is accommodated within the sleeve, said assembly being capable of being removed from the main housing part and from the sleeve through said opening, annular spacer means disposed axially between the stator assembly and the cover and having at opposite ends thereof abutment surfaces disposed respectively opposite the cover and the other end of the stator assembly and a resiliently axially compressible ring loading the parts axially into abutment with the housing, said ring and said spacer means being capable of removal from the main housing part through said opening.

Some embodiments of the invention will now be de-

Figure 1:
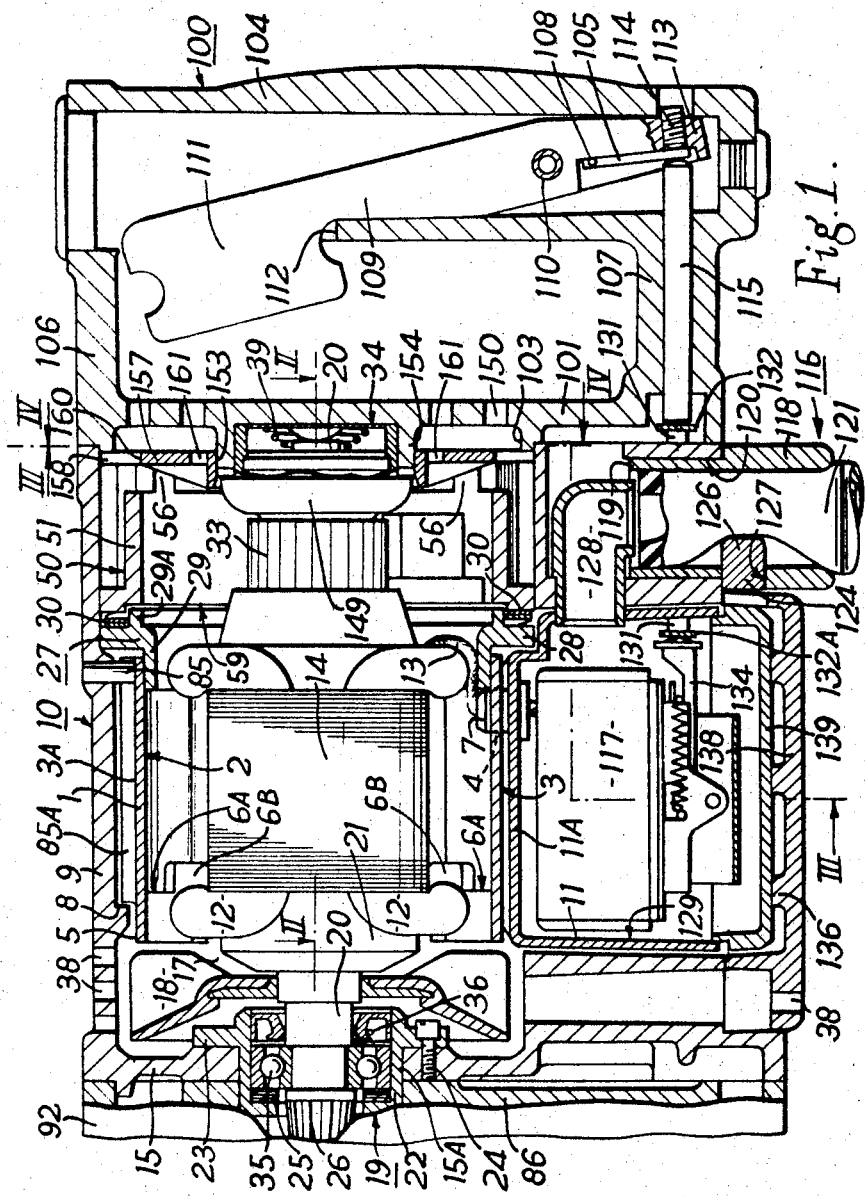
Figure 2:
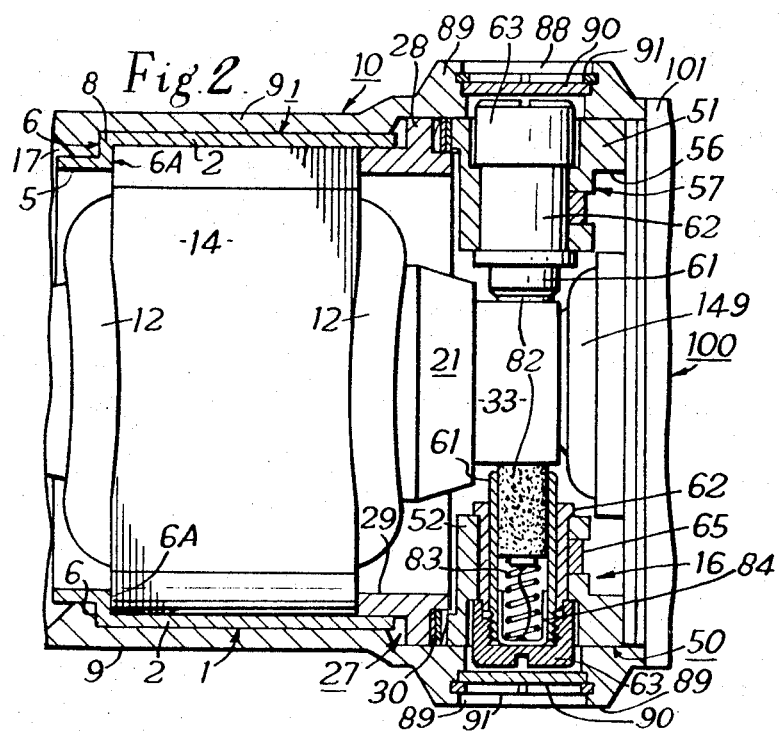
Figure 3:
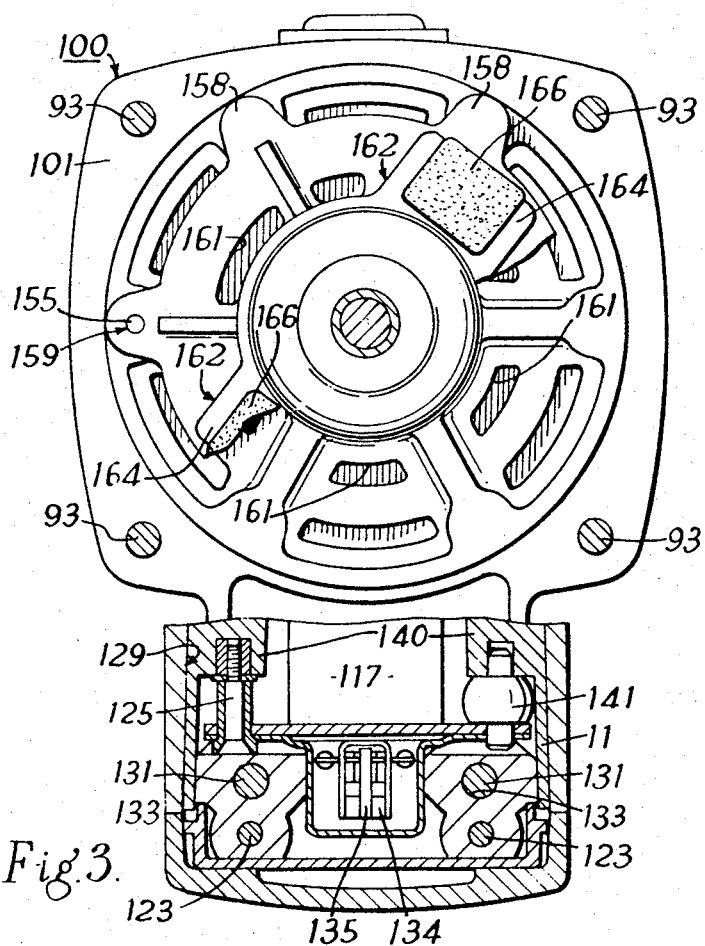
Figure 4:
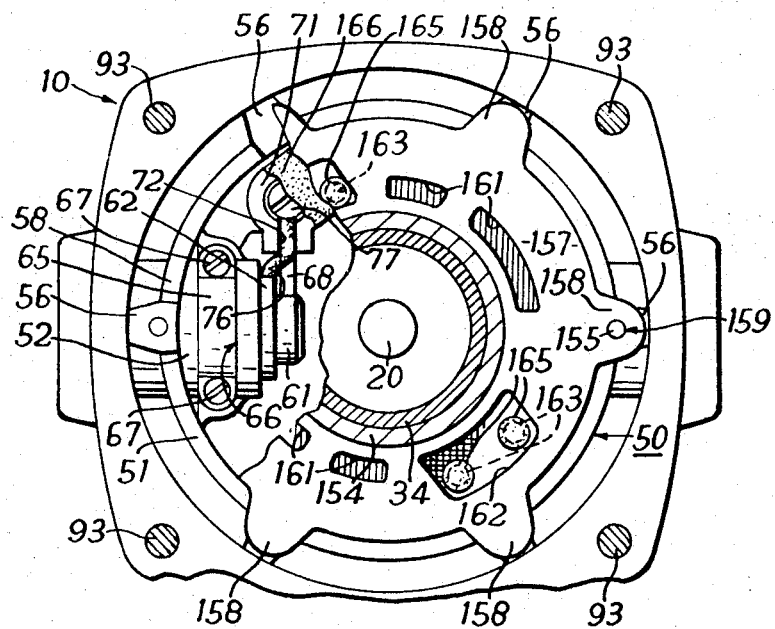

2 scribed by way of example with reference to the accompanying drawings in which:

FIGURE 1 is a longitudinal section showing the double-insulated motor of a portable percussive tool, FIGURE 2 is a partial section on line II—II of FIGURE 1, FIGURES 3 and 4 are cross-sections on lines III—III and IV—IV of FIGURE 1 respectively, FIGURE 5 is a fragmentary longitudinal section illustrating a different embodiment of the invention, FIGURE 6 is an exploded view showing in perspective some of the components of the motor shown in FIGURE 1, FIGURE 7 is a perspective view of the insulating sleeve in FIGURE 6, looking from the opposite direction, FIGURE 8 is a perspective view of the pressure ring in FIGURE 6 looking from the opposite direction, and FIGURE 9 is a perspective view of an air-deflector plate of the motor.

The motor illustrated in the accompanying drawings includes a housing having an open end and an internal abutment arranged adjacent the opposite end. Assembled within the housing through the open end thereof is a series of coaxially aranged parts including a sleeve formed of insulating material having at one end an external shoulder which coacts with the abutment. A stator assembly is housed within the sleeve with one end abutting an internal shoulder formed on that end of the sleeve having the external shoulder. A pressure ring abuts the other end of the stator assembly. The several parts are retained in the housing by a closure means which is attached to the open end of the housing and the parts are held under axial loading by an axially compressible ring which may comprise one or more waved washers and which is compressed when the closure means is secured in place. The compressible ring may be positioned between the pressure ring and a spacing ring which abuts the closure means or alternatively between the internal abutment on the housing and the external shoulder on the sleeve.

As shown more particularly in FIGURES 1, 2, 7 and 8 the stator-enclosing sleeve 1 (which is moulded in a suitable plastic or like insulating material) comprises a main hollow body portion 2 of generally cylindrical form, but having parallel flat walls 3, 3A (the latter having one or a series of holes 4) and a cylindrical end spigot 5 having an external diameter of substantially the same dimension as the distance between the outer faces of said flat walls 3, 3A.

An interrupted shoulder 6 provided at the spigot end of the sleeve 1 is adapted to seat against an internal abutment 8 in the cylindrical shell 9 of the housing 10, with or without an intervening metal abutment ring (not shown). Such an abutment ring could conveniently be of C-shape to provide a gap to accommodate therewithin the flat-top 11A of a liner 11 in an adjacent switch chamber 129. The holes 4 in flat wall 3A of sleeve 1 are provided with bushes 7 (FIGURE 2) for the passage therethrough of conductor or lead wires 13 from the field coil 12 of a flat-sided stator assembly 14, said lead wires 13 also passing through suitable openings in liner 11 to the motor switch 117 therein. The sleeve 1 may be held against angular displacement in any suitable manner, such as by means of an inwardly projecting pin 85 carried by housing shell 9 and engaging between a pair of longitudinal ribs 85A moulded on sleeve 1.

The abutment 8 which forms a seating for the shoulder 6 of sleeve 1 locates that end of said sleeve a suitable distance away from the end wall 15 of housing 10 to leave a space 17 occupied by a conventional fan 18. The end wall 15 may be and preferably is formed integral with the housing shell 9 to form a pot-shaped one-piece housing, uninterrupted by internal lugs or wide internal flanges as normally provided to receive stator clamping screws.

Within a central bore 15A in end wall 15 is a bearing unit 19 of cartridge form, which is adapted to support one end of the shaft 20 of motor armature 21. If desired the motor armature 21 may be of double insulated type. The bearing unit 19 comprises a cartridge shell 22 having a flange 23 by means of which it may be suitably secured to said wall 15 by screws 24 inserted from the outside of the wall, said cartridge shell 22 enclosing a ball bearing assembly 35 coacting with the armature shaft 20 and backed up on one side by a pack of Belleville washers 25 or the like. On the other side of ball bearing assembly 35 is a suitable seal 36; the bearing cartridge shell 22 is formed so as to provide an oil-sealed bearing unit. In the extremity of shaft 20 is screwed a tapered pinion 26 to transmitting a rotary drive to associated mechanism for reciprocating a driver (not shown) the projecting bearing unit 19 serves to locate a mounting plate 86 for the driver mechanism, which however forms no part of the present invention. The driver mechanism is housed in a main body or casing 92 to which the motor housing 10 is suitably attached.

At the other or outer end of the body 2 of sleeve 1 is located a pressure ring 27 having a radial flange 28, said ring 27 being preferably made as a moulding in plastic or other electrical insulating material. Projecting axially from one side of flange 28 is a cuff 29 which is adapted to fit snugly within the neighbouring end of sleeve 1 to prevent relative rotation, and accordingly the cuff 29 is contoured (as shown more clearly in FIGURE 8) to conform with the flat-sided shape of sleeve body 2. The cuff 29 is adapted to press the stator assembly 14 against the internal shoulder 6A of sleeve 1 and thus the external shoulder 6 of sleeve 1 firmly against abutment 8 in the motor housing 10; a number of circumferentially spaced lugs 6B inwardly projecting from shoulder 6A coact with the flat-sided stator assembly 14 to hold it against rotation. A spigot 29A projects from the other side of pressure ring flange 28, and said spigot 29A is wholly or partly of circular form to serve as a location seating for one or more waved washers 30 as shown, or equivalent spring means located adjacent the shell 9 of motor housing 10, and adapted to function as means for applying axial pressure. Other forms of axially compressible rings may comprise a series of separate circumferentially spaced spring elements carried by a ring-like support or a ring of resilient or slightly compressible metallic or non-metallic material.

The axially compressible washers 30 or other spring means expand between the pressure ring 27 and a spacer element bearing directly or indirectly against an abutment, such as provided by a cover for the pot-like housing 10, thereby firmly clamping sleeve 1 and the enclosed stator assembly 14 endwise without recourse to fixing screws or other fasteners. In this particular embodiment the spacer element forms part of a brush assembly 50 contained in the mouth end 16 of housing shell 9. That is, the spacer element here takes the form of a brush mounting ring 51 of plastic or other suitable electrical insulating material; if desired a tough washer (not shown) may be interposed between the brush mounting ring 51 and the waved washer(s) 30 which seat against flange 28 of pressure ring 27. The brush assembly 50 may be held in position by a separate detachable cover—if desired with a disc or retaining ring (not shown) of suitable insulating material interposed between the brush assembly 50 and the cover; preferably, however, as described later, this cover forms an integral part, that is, it is the base 101 of a handle assembly 100 for the portable tool.

The mouth end 16 of housing shell 9 is necessarily counterbored to receive the radial flange 28 of pressure ring 27 and this allows ample space for the ready insertion of the sleeve 1 and the stator assembly 14. Diametrically opposite parallel faces 37 and 37A are provided within the pressure ring 27 but these terminate before reaching the rim 171 of the cylindrical spigot 29A. The ring 27 and the circumferential clearances between faces 37 and 37A form through air passages for ventilation. The handle base 101—forming a cover for the pot-like housing 10—has air vents 150 and air openings 38 are provided adjacent housing end wall 15.

The end of armature shaft 20 adjacent the motor commutator 33 is journalled in the housing cover, that is, handle base 101, in a suitable bearing assembly 34, spring loaded in a manner similar to that used in bearing unit 19, except that it is preferred to substitute a more highly compressible spring means, such as a helical coil spring 39, for the pack of Belleville washers 25.

In the modification shown in FIGURE 7, which illustrates part of a different portable tool, the axially compressible ring is shown arranged in a different position in the series of abutting parts assembled in the motor housing 10A. As shown, an insulating sleeve 42 is employed which may be somewhat similar in shape to the insulating sleeve 1 already described, or at least has a reduced neck or spigot 43 providing an external shoulder 44 forming a seating for a backing ring 45. One or more waved washers 30 or equivalent spring means to provide axial pressure are interposed between said backing ring 45 and an internal flange 46 in the housing. This arrangement has independently mounted brush units 48 so that the brush assembly mounting ring as previously described is not required. Instead the pressure ring 47 abuts directly against the closure member 40.

The brush assembly 50 is shown more particularly in FIGURES 2 and 4.

The brush mounting ring 51 of the brush assembly 50 is provided with integral diametrically-opposite main bosses 52.

Mounting ring 51 is formed with a flange 54 to facilitate location within the mouth end 16 of the motor housing 10 and the periphery 55 of the ring 51 has a series of longitudinally extending ribs 56, preferably equidistantly spaced circumferentially, which do not project out radially beyond the rim of flange 54 but which do project endwise beyond the other side face 57, thereby forming a series of gaps 58 for ventilation purposes; these ribs 56 are so arranged as to block the ingress of implements or other metallic parts which might accidentally contact with electrically alive components.

To ensure accurate angular disposition of the support 50 and to guard against post-assembly displacement a screw (not shown) may be provided on the crest of one of the ribs 56, said screw engaging a suitable groove in the motor housing bore.

The brushes 82 are of conventional rectangular-section form and are slidable in the shaped bores of cylindrical brass brush holders 61 carried in flanged bushes 62 made of insulating material. The holders 61 are "force fits" in the bushes 62, which are screw-threaded to receive screw-on caps 63 which, when assembled, overlap the bushes 62. The brushes 82 are biased into rubbing contact with the commutator 33 by compression springs 83 having contact shoes 84 which abut the caps 63. The bushes 62 are adapted to be clamped within the diametrical aligned bores 64 of main bosses 52 by parallel-sided straps 65 (of metallic or of insulating material) fitted into slots 66 respectively and held by screws 67.

From the ends of holders 61 which project inwardly beyond the bushes 62, there extend, substantially at right angles to the brush axis, brass terminal pillars 68 which are brazed onto brush holders 61 and are furnished with heads (conveniently of cubical form) which are receivable within recesses in insulating terminal housings 71 (conveniently plastic mouldings). The shanks of pillars 68 passes through side notches 72 in housings 71 which have integral cylindrical spigots received in holes in ring 51.

The eyed ends of sleeved leads 76 from a motor field coil pass through notches 72 alongside of pillars 68 and are firmly secured by terminal screws 77 which engage tapped holes 78 in the pillar heads 69. Access to the brushes 82 and their holders 61 is afforded through openings 88 in bosses 89 formed on the exterior of the motor housing 10, said openings 88 being normally closed by discs 90 held by circlips 91.

An air deflector plate 157 for ventilation of the brush assembly is provided with a centrally apertured hub which is adapted to encircle a boss 154 partly housing the bearing assembly 34 adjacent the commutator 33 of the motor, and partly overlapping an insulated shroud 149. The air deflector plate 157 has a series of radiating lugs 158, preferably equidistantly spaced and of a number and outline form to match the radial ribs 56 on the brush mounting ring 51, strengthening webs 152 extending from said lugs 158 to the hub. One of the lugs 158 is provided with an aperture 159 to receive a locating pin 155 projecting inwards from the handle base 101; the pin 155 preferably passed right through said aperture 159 to engage and thus locate the brush mounting ring 51.

Air flowing into the brush end of the motor housing through slots 150 in the handle base 101 has to pass either over the rim 160 of the deflector plate 157, between the lugs 158, or through air slots 161 in said plate 157 which are arranged so as not to register with the air slots 150 in the handle base 101, so that an implement or other article inserted through one of the slots 150 is arrested by plate 157, and cannot touch "electrically live" parts.

The plate 157 also serves another purpose, that is, recessed boxes 162 are provided in said plate and have holes 163 to receive stud-head buttons 165 forming integral parts of moulded silicone rubber pads 166. These pads 166 are adapted to apply end clamping pressure on the heads 69 of the terminal pillars 68 and on portions of the field coil leads 76. The radial lugs 158 of deflector plate 157 are clamped against the face of the handle base 101 by the ribs 56 of the brush mounting ring 51.

The handle assembly 100 of the portable tool (FIGURE 1) of the drawings comprises the base 101 adapted to serve as a cover for one end of the motor housing 10 as already referred to, a spigot 103 being provided on said base 101 for location within the open end of the motor housing 10. The base 101 is fastened to motor housing 10 by screws 93 (see FIGURES 3 and 4).

The hand grip 104 comprises a tube connected to the base 101 by a solid web 106 at one end and by a hollow webed pillar 107 at the other end; a part of said grip tube 104 may be partially or completely enclosed in a sheath (not shown) of moderately resilient rubber or the like.

Within the grip tube 104 is accommodated the major part of an operating lever 109 rockable on any intermediate cross-pin 110, the longer portion of lever 109 having a head 111 adapted to project through a longitudinal slot 112 in the grip tube 104. The tail 113 of lever 109 carries an adjustable screw stop 114 adapted to apply pressure, through a leaf element 105 hinged on an integral projection 108, to one end of a plunger 115 slidable within the bore of pillar 107, and thus compensate for manufacturing variations in the various components concerned with switch operation.

A cable entry assembly 116 is aligned with the plunger 115 and prevents in-line mechanical connection with a switch 117 contained in the switch chamber 129 of the motor housing 10.

The cable entry assembly 116 comprises a cable end housing 118 made of a suitable insulating material and having a tubular spigot 119 receivable within a hole 120 in motor housing 10, a resilient sheath 121 as customarily employed on the end of a trailing power cable being receivable within the bore of housing 118. The cable end housing 118 is flanged to enable it to be secured to motor housing 10.

For securing cable sheath 121 in position a locking bridge 124, also made of insulating material, is adapted to be secured, by screws (not shown) to housing 118 so that a block 126 on said bridge enters a through slot 127 in the housing 118 to bear against sheath 121. The end of the power cable (not shown) is passed through an angled protective duct 128 of insulating material to enable the cable ends to be connected to switch 117.

A pair of rods 131 made of insulating material and connected together at opposite ends by tie bars 132 and 132A extend through parallel holes 133 in motor housing 10, at opposite sides of the hole 120 which receives the cable end housing spigot 119.

The tie bar 132 is engaged by plunger 115 as it is projected under direct action of operating lever 109 in hand grip 104, thereby to displace rods 131 and, through tie bar 132A and a strut 134, to move the operating member or "tumbler" 135 to operate switch 117. The switch 117 may be of such a construction that it would remain on if pressure on lever 109 is relieved, another gripping action on said lever being required to project plunger 115 forward again to switch off switch 117.

For double-insulating purposes a moulded box-like liner 11 of insulating material is secured in the switch chamber 129 and is suitably apertured for the passage of various components which project into said liner. The switch chamber 129 is made without a roof, so that the flat top 11A of liner 11 is exposed in the interior of motor housing 10 and lies in close proximity to the stator assembly 14, whilst outward projection of the switch chamber is reduced to a minimum.

The liner 11 is held in switch chamber 129 in any suitable manner, such as by pressure applied through rubber blocks by abutment strips 136 in a switch chamber cover 138, or by a liner 139 in said cover; the liner 11 has integral side blocks 140, to which switch 117 may be secured by the screws 125 which force it onto the resilient mountings 141.

What is claimed is:

1. An electric motor for a portable power tool comprising a motor housing including a main housing part having an opening at one end and having adjacent the other end thereof of an internal abutment surface facing towards said one end, and a cover rigidly detachably secured to the main housing part at said one end for closing said opening, and a plurality of coaxially arranged parts disposed within the housing between said internal abutment and the cover, which parts comprise a locating sleeve made from electrically insulating material and capable of insertion in the main housing part through said opening, which sleeve has an abutment surface facing said internal abutment surface of the main housing part and has an internal shoulder facing towards the cover, a stator assembly one end of which is disposed opposite said internal shoulder and the full length of which is accommodated within the sleeve, said assembly being capable of being removed from the main housing part and from the sleeve through said opening, annular spacer means disposed axially between the stator assembly and the cover and having at opposite ends thereof abutment surfaces disposed respectively opposite the cover and the other end of the stator assembly, and a resiliently axially compressible ring loading the parts axially and being a single means for urging said parts into abutment with the housing, said ring and said spacer means being capable of removal from the main housing part through said opening.

2. An electric motor as claimed in claim 1, wherein the axially compressible ring is interposed between the internal abutment surface in the main housing part and the facing abutment surface on the sleeve.

3. An electric motor as claimed in claim 1, in which said sleeve comprises a main body of generally opposed cylindrical shaped wall portions and having flat parallel walls connecting said cylindrical wall portions and defining therewith a space for receiving the stator assembly, the stator assembly having flat sides, and a cylindrical end spigot having an external diameter of substantially the same dimension as the distance between the outer faces of said flat walls, the said main body and end spigot defining between them an external shoulder which provides the abutment surface for coacting with said internal abutment surface in the main housing part.

4. An electric motor as claimed in claim 3 in which said sleeve has a pair of spaced external longitudinal ribs, and said housing has an internal projection thereon with which said ribs engage to prevent rotation of said sleeve.

5. An electric motor comprising a motor housing including a main housing part having an opening at one end and having adjacent the other end thereof an internal abutment surface facing towards said one end, and a cover rigidly detachably secured to the main housing part at said one end for closing said opening, a locating sleeve made from electrically insulating material and capable of insertion in the main housing part through said opening, which sleeve is in axial abutment with said abutment surface and has an internal shoulder facing towards the cover, a stator assembly one end of which is disposed in abutment with said shoulder and the full length of which is accommodated within the sleeve, and spacer means extending between the cover and the other end of the stator assembly, which spacer means comprises a pressure ring disposed adjacent the end of the sleeve nearer the cover and abutting the other end of the stator assembly axially, an annular brush-bearing spacer disposed within the main housing part in operative axial abutment with the cover, brushes for the motor which brushes are mounted in the spacer, and resilient means disposed between the spacer and the pressure member for urging the pressure member, the stator assembly and the sleeve away from the cover and urging the spacer towards the cover, and means locating the spacer against rotation about the motor axis relative to the housing, the housing having an aperture formed therein opposite each brush for affording access to that brush.

6. A motor as claimed in claim 5, wherein the spacer is made from an electrically insulating material.

7. An electric motor as claimed in claim 5, in which said pressure ring has a radial flange and a cuff projecting axially from one side thereof and abutting the end of the stator assembly, said cuff having a shape conforming to the internal shape of said sleeve and fitting snugly therein.

8. An electric motor for driving a portable power tool comprising means providing casing end members which are rigidly but detachably secured relative to each other and respectively having bearings for an armature of the motor, and a sleeve portion disposed axially against one of the end members and extending towards the other of the end members, which sleeve portion is made from an electrically insulating material, is open at its end nearer said other end member, and has an internal abutment surface disposed adjacent and facing axially away from said one end member, a stator assembly in axial abutment with said internal abutment surface and wholly accommodated within the length of the sleeve which assembly can be inserted into and removed from the sleeve through said open end of the sleeve, and spring means acting between said other end member and the stator assembly and being a single means urging the assembly resiliently against said abutment surface.

9. An electric motor for a portable power tool, comprising a main housing part which has adjacent one end thereof an internal axially facing abutment surface and at its other end an opening, a sleeve made from electrically insulating material and capable for assembly and dismantling purposes of insertion and removal through said opening, which sleeve abuts said abutment surface and has an internal abutment surface facing said opening, an armature assembly disposed in abutment with said internal abutment surface of the sleeve and wholly within the sleeve, a cover rigidly and detachably mounted on said main housing part for closing off said opening, and spring means acting between the cover and the armature assembly and being a single means to press the assembly against the abutment surface within the sleeve and to press the sleeve against said abutment surface within the main housing part.

No references cited.

MILTON O. HIRSHFIELD, *Primary Examiner.*

G. NUNEZ, *Assistant Examiner.*